Oct. 31, 1950  H. H. KEEN  2,528,438
APPARATUS FOR VERIFYING PERFORATED RECORD CARDS
Filed Dec. 7, 1948  6 Sheets-Sheet 1
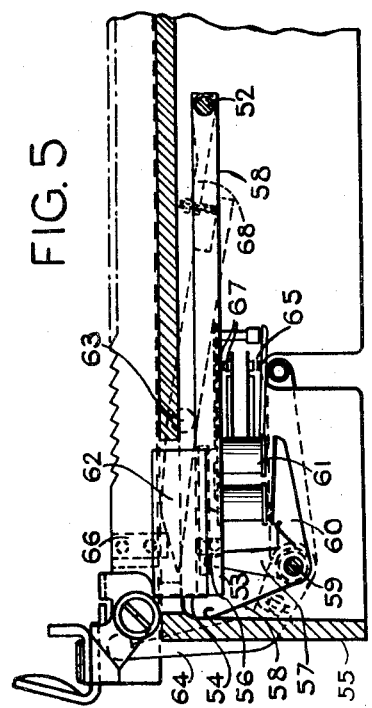
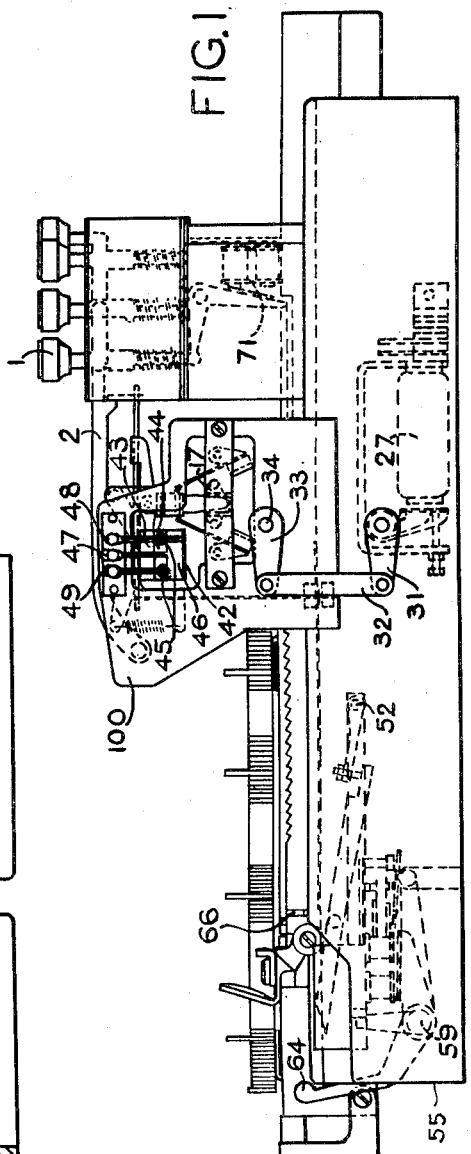
INVENTOR
HAROLD H. KEEN
BY
Ralph C. Dustin
ATTORNEY Oct. 31, 1950 — H. H. KEEN — 2,528,438
APPARATUS FOR VERIFYING PERFORATED RECORD CARDS
Filed Dec. 7, 1948 — 6 Sheets-Sheet 2

INVENTOR
HAROLD H. KEEN
BY Ralph C. Dustin
ATTORNEY

Oct. 31, 1950  H. H. KEEN  2,528,438
APPARATUS FOR VERIFYING PERFORATED RECORD CARDS
Filed Dec. 7, 1948  6 Sheets-Sheet 3

INVENTOR
HAROLD H. KEEN
BY Ralph C. Dustin
ATTORNEY

Oct. 31, 1950   H. H. KEEN   2,528,438
APPARATUS FOR VERIFYING PERFORATED RECORD CARDS
Filed Dec. 7, 1948   6 Sheets-Sheet 4

INVENTOR
HAROLD H. KEEN
BY
Ralph C. Dustin
ATTORNEY

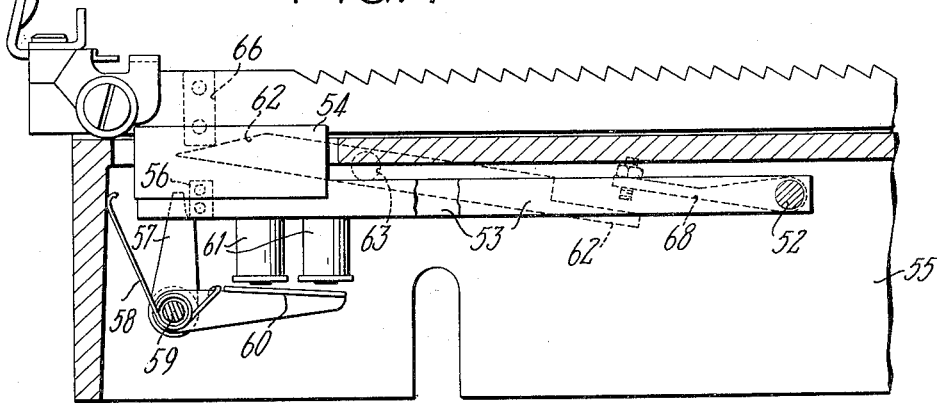
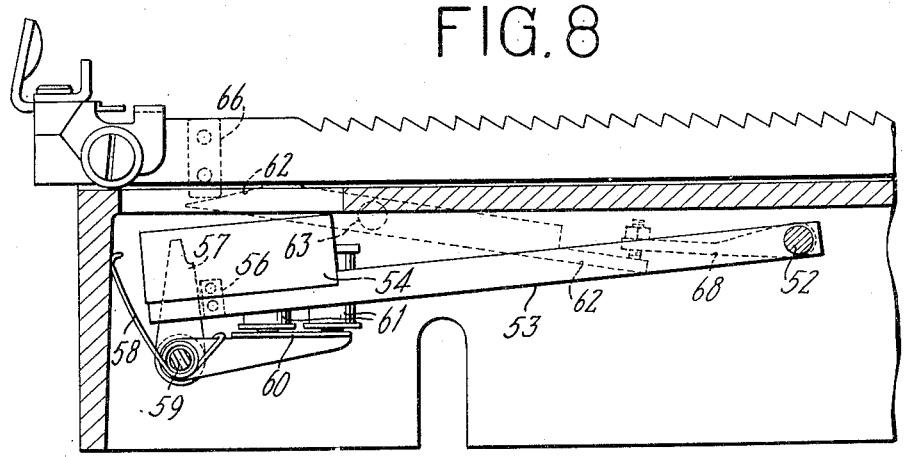

Patented Oct. 31, 1950

2,528,438

UNITED STATES PATENT OFFICE 2,528,438

APPARATUS FOR VERIFYING PERFORATED RECORD CARDS

Harold Hall Keen, Letchworth, England, assignor to International Business Machines Corporation, New York, N. Y., a corporation of New York Application December 7, 1948, Serial No. 63,866
In Great Britain September 23, 1947

15 Claims. (Cl. 73—156)

1

This invention relates to improvements in machines for verifying perforated record cards and in particular to the kind in which a record is verified in step-by-step manner, a column at a time, by means of a keyboard or the like, such that when the hole or holes in a column of a card being verified differ from the set-up effected by the keyboard, warning is given to the operator, as for instance, by the failure of the machine to rack the card to the next column.

When using purely mechanical means, the maximum speed of verification may be limited by the time taken by the machine to complete a verifying operation, and not by the speed of the operator. It is an object of the present invention to provide an improved form of electro-mechanical device for detecting errors in perforated record cards, in which the operating speed is considerably increased, so that the machine speed is not the limiting factor. These errors may consist of holes punched in the wrong positions, omitted altogether, or punched in addition to the correct hole or holes.

It is possible that the operator may depress an incorrect key and, accordingly, it is another object of the invention to permit the operator only one further opportunity of depressing an incorrect key before the card is rejected as incorrect.

It is a further object of the invention to place the card ejection mechanism under control of the verifying mechanism so that any card found to be incorrect after the second attempt at verification has been made is racked out and manual removal of the card is rendered difficult as an additional warning to the operator that the card has not been verified.

According to the present invention, a verifier of the kind referred to has a card hole sensing means for each index position in a column, at least one key for each sensing means, and for each index position a rod, the rod being positioned at one end by a key or keys and at the other end by the sensing means, the movement of the center portion of the rod controlling the setting of a switch, all the switches being wired in series so as to form a checking circuit which is broken when the key setting and the holes sensed by the sensing means differ, thereby causing failure of the escapement to operate.

In the preferred form of the invention, the sensing means comprises pins which are pressed by springs to protrude through any hole in the column being sensed. Each pin and the appropriate key are linked by an arm, so that depression of the key causes one end of the arm to

2 be lowered and protrusion of the pin through a hole causes the other end to be lowered. An electrical switch of the plunger type is attached to the center portion of each arm and may take up any one of three positions depending upon the position of the arm. The switches are connected in series and the circuit is completed except when one or more switches is in the "middle" position corresponding to movement of one end only of the arm. Movement of the card to bring the next column to the verifying position is dependent upon completion of this switch circuit. Hence if the circuit is not completed, indicating an error in the verification, the card is not moved to a new position.

As a further feature of the invention, if an error is indicated and a key is depressed for a second time, should the circuit through the plunger switches not be completed, the eject mechanism is called into operation and the card is racked out for manual removal, the fact of error being indicated again to the operator by a fence making removal difficult.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 shows a front view of the machine.

Fig. 5 is a side elevation of the fence mechanism.

Figs. 7 and 8 are schematic views of the fence mechanism showing the parts in blocking position in Fig. 7 and in released position in Fig. 8.

Figure 2A:
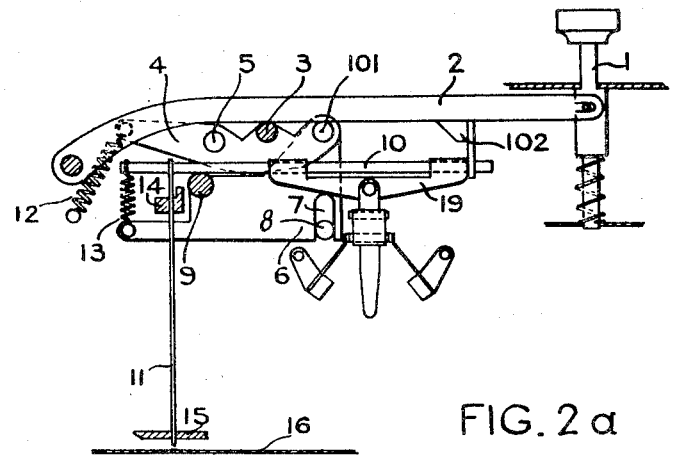
Fig. 2a shows the testing mechanism for the condition when none of the keys are depressed.

Fig. 1 gives the general arrangement of the machine incorporating keys 1 including the usual twelve keys Y, X, 0, 1, 2, 3, 4, 5, 6, 7, 8, 9 to deal with the usual twelve index points in a column, and in addition the usual other keys such as space key, the release key, the tab. space key and a cancel key. Depression of any of the twelve keys Y to 9 causes the pins 11 (Fig. 2a) to test the card for holes. Each key 1 (Figs. 1 and 2a), by a pin and slot connection, slidably engages its respective key lever 2. Each of the key levers Y to 9 and a further lever operated by the space key, impinge on the bail rod 3 fixed to the bail levers 4 pivotally mounted on a rod 5 which is supported by the main plates 100 fixed to the front and rear of the main base of the machine. Bail plates 6 (one at the front and the other at the rear of the machine) are pivotally attached by studs 101 to bail levers 4. In each bail plate 6 is formed a slot 7 which is engaged by a stud 8 to guide the plates 6 in as near a vertical movement as is practicable. Between the front and rear bail plates 6 is fixed a bail rod 9 which supports thirteen horizontal rods 10. Springs 13 tend to keep rods 10 in resilient engagement with the bail rod 9. Attached to each of the horizontal rods 10 is a sensing pin 11 guided for perpendicular movement by the bar 14 at the upper end and the stripper 15 at the lower. On the depression of any key 1 a corresponding movement of the associated key lever 2 moves the bail lever 4 in a clockwise direction against its spring 12. Bail plate 6 is lowered by this movement and by reason of the springs 13, the sensing pins 11 are lowered onto the card 16. If a hole is encountered, the corresponding pin 11 will make a more extended movement than the pin that meets the unpunched portion of the card. There are thus three possible positions for any one of the twelve pins 11: Its normal or upward position, its intermediate position as given when engaging an unpunched portion of the card, and its extreme lower position attained when either a hole is encountered or there is no card present. These three positions have a direct effect on one end of rod 10.

Referring to Fig. 2a, the right-hand end of each rod 10 is attached to a downward extension 102 of its key lever 2 so that this right end of the rod 10 obeys the key movement, i. e., an up or down position, and the left-hand end takes a position determined by the feeler pin and the key movement, as before described.

Considering the combinations of these movements, it will be seen that with no key depressed for testing, rods 10 will be in 1st position corresponding to left and right ends up, and the sensing pins 11 will be free from the card 16. With a key depressed for testing any particular rod 10 may be in—

Figure 2B:
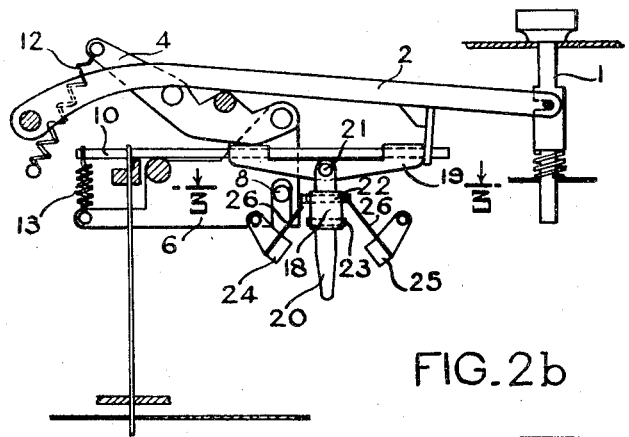
Fig. 2b shows the testing mechanism for the condition when the card contains a hole and the related key is depressed.
Figure 2C:
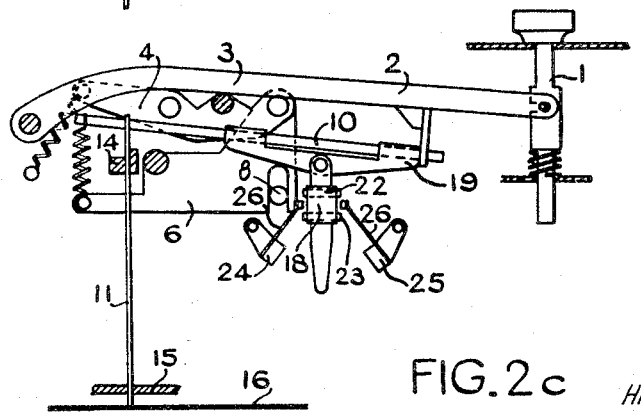
Fig. 2c shows the testing mechanism for the condition when the card contains no hole and the related key is depressed.
Figure 2D:
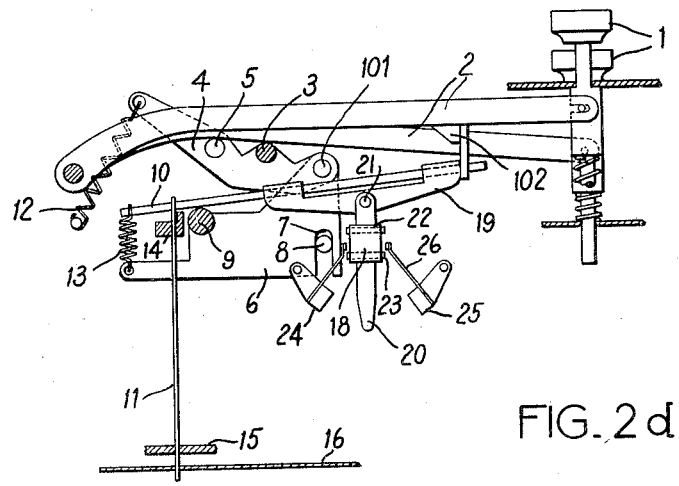
Fig. 2d shows the testing mechanism for the condition when the card contains a hole and an unrelated key is depressed.
Figure 2E:
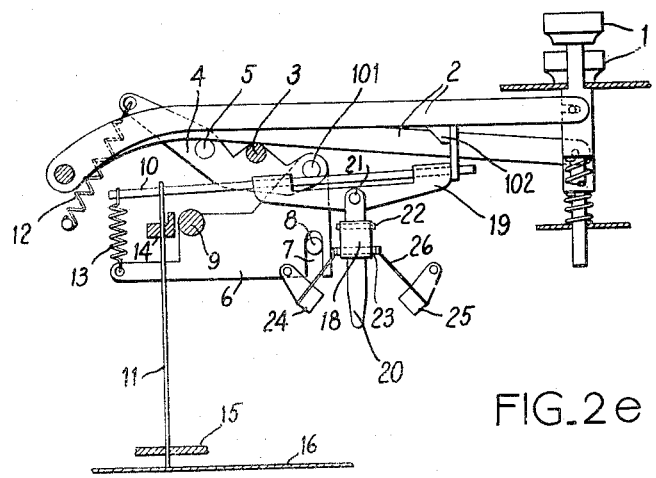
Fig. 2e is similar to Fig. 2d except that the card contains no hole for the mechanism shown.
Figure 3:
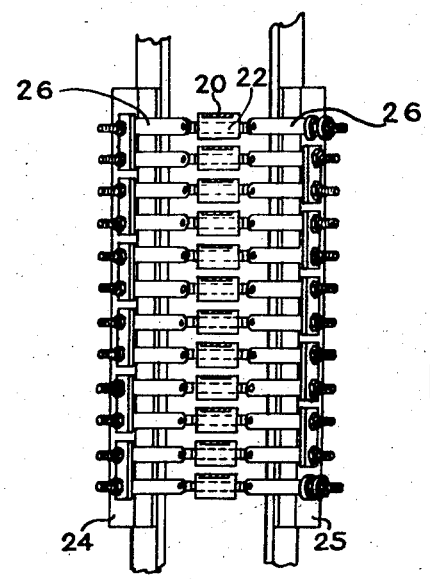
Fig. 3 is a plan of the switches shown in elevation in Fig. 2b and taken on line 3—3.

2nd position—corresponding to left end intermediate (no hole and unrelated key depressed), right end up (related key not depressed) (Fig. 2e).
3rd position—corresponding to left end intermediate (no hole), right end down (related key depressed) (Fig. 2c).
4th position—corresponding to left end down (either hole or no card and unrelated key depressed), and right end up (related key not depressed) (Fig. 2d).
5th position—corresponding to left end down (either hole or no card), right end down (related key depressed) (Fig. 2b).

The 2nd and 5th positions represent correct verification and the 3rd and 4th positions represent incorrect verification. By suitable choice of amplitudes of movements given to the two ends of the rods 10, the 3rd and 4th positions can be made to give a common position for the plunger switches positioned centrally on rod 10.

Attached to each of the twelve rods 10 is a formed bracket 19 slidably mounted on rod 10, within a range prescribed by certain retaining rings (not shown). A plate 20 is pivoted to bracket 19 by the pivot stud 21 and the lower end of plate 20 is guided by suitable slots in a bracket 17 attached to the front and rear plates (see Fig. 1). Each plate 20 carries an insulating piece 18 in which are fixed two metal segments, the upper 22 and the lower 23, by which an electrical circuit can be controlled. Adjustably mounted on the main front and rear plates are two support bars 24 and 25, carrying contact brushes 26, insulated from each other and from the support bars 24 and 25. The brushes 26 coact with the contact segments 22 and 23 and are so vertically disposed as to discriminate between the positions described, i. e., with the rod in its upper or 2nd position, contact with segment 23 is made. With any rod 10 in its intermediate 3rd or 4th positions, no contact is made (see the non-verifying positions before described).

Finally, when rod 10 makes its fullest bodily descent (position 5), contacts 22 and 26 are made. Each contact assembly formed by the two segments and the respective right- and left-hand brushes is connected in series to the next position (see Fig. 6). Thus, the set of twelve plates and contacts form plunger switches which in combination form a checking mechanism by which current to an escapement magnet 27 is controlled.

*Space key*

Normally the space key advances the card carriage, and with it the card, one column. In verifying punches it is desirable that the space key can only thus advance the rack when no hole is present in the column being spaced. For this reason, the space key has a key lever 2 to operate the bail and lower the sensing pins onto the card. It, however, does not have the rod 10 and the associated parts that form the switches. With no holes present, therefore, none of the rods 10 are actuated to move the contact segments 23 out of engagement with the brushes 26, so that the circuit is maintained through the checking system and the card carriage allowed to operate. If, on the other hand, a hole is present, then the corresponding pin 11 makes its full movement with its rod 10, but as no corresponding key has been operated, the right-hand end of the rod 10 remains in the upper position, and the brushes 26 contact the insulation between the respective segments 22 and 23 and, therefore, no circuit is possible through the checking system. Therefore, the escapement rack magnet 27 is not energized and spacing is checked.

*Escapement mechanism*

The escapement mechanism, although forming no part of the invention, will be explained for purposes of clarity.

Figure 4:
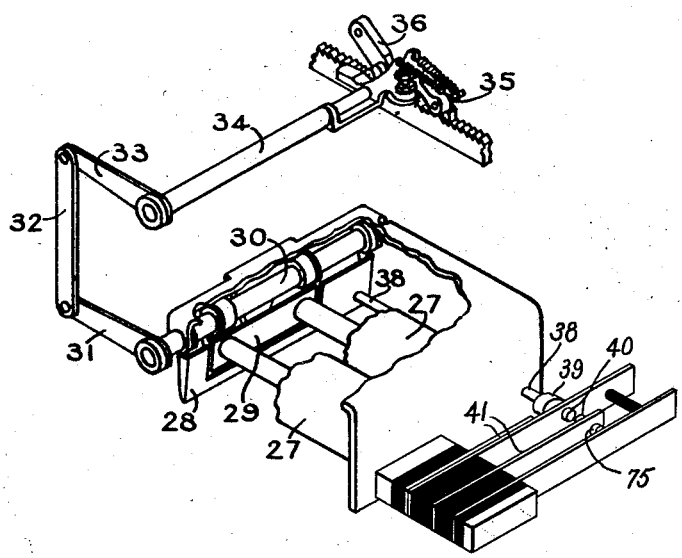
Fig. 4 is a perspective view of the card carrier escapement control with a portion broken away.

An electromagnet 27 supported by the usual bracket and yoke is fixed to the underside of the machine (Figs. 1 and 4). Upon its energization an auxiliary armature 28 and a main armature 29 are, by an anti-clockwise movement attracted to the magnet. The main armature 29 is rigidly fixed to shaft 30, so that the movement to the magnet causes a similar movement of shaft 30, which by the linkage formed by the levers 31 and 33, and the link 32, transmits the same movement to the escapement shaft 34, which thereupon withdraws the dog lever 35 from the teeth of the card carriage rack and at the same time advances the escapement pawl 36 into the path of the rack teeth. The dog 35 and the escapement 36 are so located as to be slightly more than a given number of teeth apart, so that as the dog 35 leaves the path of the rack teeth, the rack under the urge of its spring moves to the left until it registers on a corresponding tooth with the escapement lever 36. On the deenergization of the magnet 27 a spring (not shown) urges the armature 29 away from the magnet 27, and by the subsequent clockwise movement of the escapement shaft withdraws the escapement 36 from the rack, whilst the dog lever under urge of its spring engages the next tooth of the rack, following the latter completing its single tooth movement. In this way the next column of the card is presented to the sensing pins position for test.

The auxiliary armature 28 is adapted to close and hold the circuit by a pair of contacts. The armature 28 is freely mounted on shaft 30, and on its approach to the magnet 27, urges rod 38 to the right, which via the insulating head 39 opens the contacts 75 and closes the contacts 40 supported by the flat springs 41. On the deenergization of the magnet the tension inherent in the rear contacting support spring 41 moves the auxiliary armature 28 away from the magnet to its normal off position. Thus the energization of magnet 27 results in a slight card movement within the limits of tolerance permitted by the sensing pins, and deenergization results in a column spacing movement at a time when the pins are withdrawn. That the sensing pin withdrawal has been effected before escapement can occur is secured by the setting of the commutator.

Commutator

It is necessary first to describe the main current controlling apparatus, as it is undesirable to allow the making and breaking of current to take place on the checking switches, i. e., on the segments 22 and 23 and the brushes 26. Fixed to the front bail plate 6 (see Fig. 1) is a commutator assembly 42 formed by a strip of insulating material 43, a brass contact strip 44, two tungsten inserts 45 and a glass strip 46. This commutator, therefore, obeys all the movements of the bail lever 4 and becomes movable in the direction of the line of the three brushes 47, 48 and 49. Current is brought to the commutator by the brush 47 which is in constant engagement with the strip 44. When a key is depressed the commutator 43 moves in the direction of the arrow (Fig. 6) and the bail lowers the sensing pins to sense the cards. Toward the bottom of this stroke brush 48 is timed to contact the tunsten inserts 45, which are integral with the brass strip 44 and thus a circuit is completed. This circuit becomes interrupted when the bail lever commences its return to normal position. Likewise, brush 49 is timed to make contact with its tungsten insets shortly after the commencement of the bail descent, consequent upon the pressing of a key, and in the same way opens its circuit just before the upward movement of the bail is completed consequent upon the release of the key.

Operation

Figure 6:
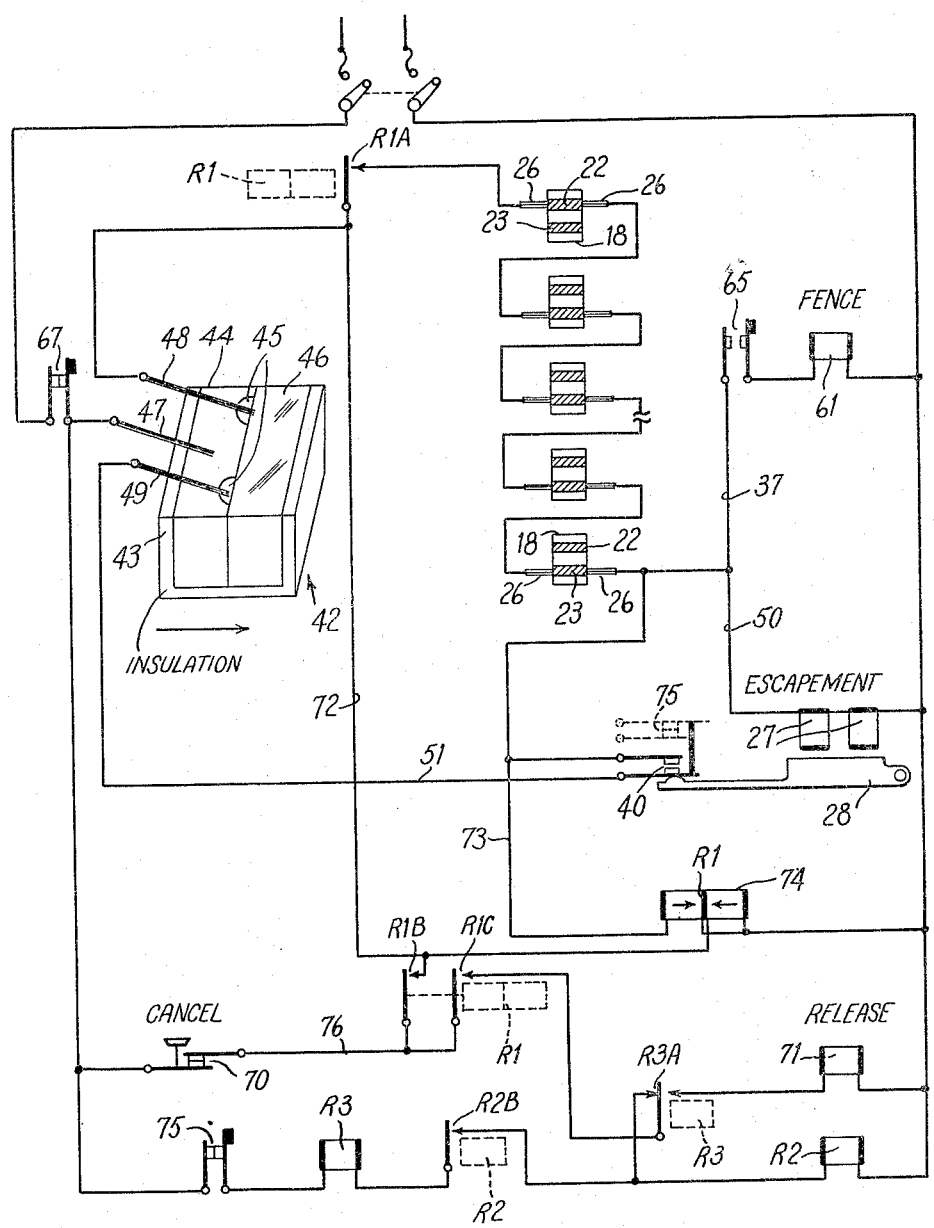
Fig. 6 is a schematic wiring diagram of the machine.

The complete circuit shown in Fig. 6 is connected between the main terminal points represented by the usual main switch and protective fuses. Operation of the circuit where corroboration of the key pressed takes place, is as follows:

On the pressing of the key associated with the feeler pin that encounters a hole, the corresponding brushes 26 leave the segment 23 and contact with segment 22; coincidentally with this, the commutator 42 also moves over the brushes 47, 48 and 49. Brush 48 is timed to contact its segment 44 at a time just following the contacting of brushes 26 with the segment 22 and a circuit is completed from the left-hand line as follows: Fuse and main switch, normally closed contact 67, brush 47, switch path 44 and 45, brush 48, normally closed contacts R.1.A of relay R.1, the checking system formed by the twelve sets of segments 22, 23 and brushes 26, line 50, the escapement magnet 27, the main switch and fuse, to the right-hand line. The escapement magnet 27 energizes and attracts the auxiliary armature 28, which closes the holding contacts 40 and the circuit thus initiated is now maintained from brush 49, line 51, the holding contacts 40, line 50 and so to the escapement magnet 27. The energizing of the main armature 29 prepares, as before described, a spacing of the card carriage rack. On the release of the key concerned, the bail and the associated mechanism returns to normal and at a short time before reaching its uppermost position, commutator 42 moves away from the brushes 48 and 49, the holding circuit before described being opened by the brush 49. It is observed that the return movement also returns the checking system brushes 26 and segments 22 and 23 to normal, and the movement of these contacts has taken place whilst brush 49 is holding its circuit. In this condition, therefore, there can be no destructive arc on brushes 26 and segments 22.

The foregoing has explained the operation of the machine under correct verifying conditions, and it is now proposed to explain requirements and the action of the machine on non-verifying conditions or non-corroboration.

It is preferred, on such machines, to give the operator some form of signal to indicate that the holes punched in a given column do not coincide with the keys pressed. It is usual to provide that the escapement to the next column fails to occur, and an error key is then used to rack the card out. This signal signifies to the operator that (1) the original card has been wrongly punched, or (2) the operator has pressed the wrong key on verification. In the former case, the cards should be removed from the machine and segregated from the remainder, and in the latter case the operator can re-verify. This latter procedure, however, is conductive to easy falsification, as if each key is pressed in turn, the correct punching will eventually be discovered and the machine will pass that column as verified. To render this possibility as small as possible, it is preferred to allow the operator one further attempt only to prove the card, and if the second attempt results in non-corroboration, then it is preferred to again warn the operator. Furthermore, in the event that the error is made in the 80th column the rack movement alone can be inadequate warning to the operator.

One method of producing this extra warning is by reducing the accessibility of the card for removal, as by a fence or gate.

Fence

Fig. 5 gives a view of the left-hand end of the machine with the card, and with it the rack, approaching the column 80 position. Housed in journals in the side frame of the casting 55 is a shaft 52 carrying twin levers 53 that extend to the left end of the machine. Spanning the two levers 53 is an upwardly extending projection 54, which passes through the bed plate, which is also the card line, to form a fence to impede manual access to the card. Extending downwards from the said levers 53 is a latch plate 56, adapted to engage a pawl 57, which by spring 58 is urged in a clockwise direction to support the aforementioned fence in the position shown. The pawl 57 is fixed to shaft 59, also mounted in the side frame member. Fixed to the same shaft is the armature lever 60 positioned to be attracted to the fence magnet 61, on the energization of which armature 60 moves in an anti-clockwise direction to remove the pawl 57 in the same direction from the support of the fence, which thereupon drops under the force of gravity to allow complete access to the card. On the insertion of a new card and the movement of the rack, and with it the card, to column 1 to resume verification, a projecting plate 66 fixed to the rack engages lever 62, pivoted in the side frame at 63, and rocks it anti-clockwise. A right-hand extension of lever 62 engages the lever 68 via an adjusting screw. Lever 68 is rigidly attached to the shaft 52 and by this means the anti-clockwise movement of lever 62 transmits a clockwise movement to shaft 52; thus the fence 54 and the levers 53 are reset to the upward position, supported by the pawl 57 as shown. Further mechanism is explained as follows:

The normal operation of the rack is step-by-step to the left until the last column is reached, viz., column 80. To maintain consistency, it is desirable, after the verification of column 80, to allow a further rack movement to what is loosely termed "the 81st column." As the electrical control of the aforementioned fence mechanism is operable at these positions, it is necessary to signify these rack positions by the condition of certain contacts; thus contact lever 64 freely mounted on shaft 59 is positioned to contact the rack by its upward extension and move anti-clockwise with the rack from column 79 to 80. On the final movement to column 81, lever 64 makes a further increment of movement in the same direction. This is registered on contacts in the following manner: A rightwards extension of lever 64 is so positioned as to close contacts 65 on the passage from column 79 to 80 (Fig. 5) and in addition to open contacts 67 in the passage from column 80 to 81.

In addition to the foregoing, a key labeled "Cancel" (Fig. 6) is provided and on pressure of which a pair of contacts 70, normally closed, are made to open.

Finally, to complete the scheme, an automatic operation of the release key by magnet 71 (Fig. 1) is provided, in addition to the normal manual operation.

In the case of non-corroboration, as has been explained, the feeler pin movement is not accompanied by the associated correct key movement and/or vice versa, and consequently there was an uncompleted circuit, through the checking system formed by segments 22 and 23 and brushes 26. These conditions operate to signify the non-corroboration as follows (see Fig. 6).

On the movement of the bail in a downward direction, and just previous to the extreme position being reached, brush 48 on the commutator 42 contacts to complete a circuit to the escapement magnet 27. In addition to this, other circuits take place over lines 72 and 73. These two lines supply current to the respective coils of the differentially wound relay magnet 74 of relay R1. In the non-corroborating condition previously explained, there is, therefore, no outlet of current from the checking system 22, 23 and 26 to line 73. Differential relay R1 then becomes energized by the unobstructed circuit from brush 48, line 72, and closes its holding contacts R1B completing the holding circuit from the left-hand line, contact 67, normally closed Cancel contact 70, contacts R1B and a winding of relay R1 to the right-hand line. The energizing of relay R1 also causes contacts R1A to open, and contacts R1C to close. By this means, the non-corroborating condition becomes registered, and it is noticed that any attempt at falsification by manipulation of the keys is rendered ineffective by the now opened normally closed relay contacts R1A situated between brush 48 and the checking system 22, 23 and 26, and in addition no escapement movement of the rack can take place because of the no-circuit condition of the checking system. Coincidentally with the energizing of relay R1, another relay R2 becomes energized over the line 76, contacts R1C and the normally closed contacts R3A of a relay R3. Relay R2 closes its holding contacts R2B, which prepares a holding circuit from left-hand line, contacts 67, contacts (normally closed) 75 and the relay R3. It is to be noticed that relay R3 cannot energize at this time as there is no potential difference between the terminal ends because of the shorting effect of the holding circuit formed by R1C and the maintained connection down line 76, contacts R3A and the now closed contacts R2B. The machine, therefore, at this stage is in a completely hesitant condition in that it may proceed in either of two ways.

It was mentioned previously that one attempt only to rectify any error made by the operator is allowed. The correct procedure to attain this is as follows: Press the "Cancel" key, and by so doing the contacts 70 open, and discontinue the holding circuit to relay R1 over the line 76. By the opening of this circuit, relay R1 returns to unenergized condition and reestablishes the checking line circuit contact R1A and, moreover, opens the contacts R1C to remove the shorting condition imposed on the relay magnet R3, which now, because of the closed contact R2B, energizes and changes over its contact R3A between line 76 and release magnet 71. The result so far is to reestablish the machine for further verification and at the same time retaining the fact on relays R2 and R3 that one error is registered. If on the second attempt by the operator, the correct key is pressed, then the machine will proceed normally and the magnet 27 is allowed to operate and space the carriage rack. In so doing, the escapement magnet armature will open its normally closed contacts 75 and deenergize R2 and R3 and thus cancel the registered error. If on the other hand a second error is made, then the circuit down line 72 will again energize relay R1 as before, with the difference, however, that the now changed-over contacts R3A of relay R3 will divert the circuits down line 76 to the release key magnets 71, which thereupon energizes, attracts its armature, thereby operating the normal release key mechanism, and the rack, and with it the card, will move to the extreme 81st position. It is to be noticed that although on 79th and 80th columns contacts 65 close, there is no operation of the fence magnet 61. By this means, the operator is reminded that the card has not survived verification, and the reduced accessibility of the card for manual removal represents the last effort the machine can make in reminding her of this fact.

There remains, finally, to explain the operation of the release of the fence when all verifying operations have correctly progressed. The card consequent to the succession of rack movements will eventually reach column 80. On this position being reached, the contacts 65 close and prepare the circuit for the fence magnet 61, which, in the event of the final test on column 80 being correct, becomes energized from line 37 on the completion of the check circuit via R1A and 22, 23 and 26. If, on the other hand, an error is made on column 80, then, due to the failure of the check circuit, the operator will obtain a reminder that the card is wrong by the non-release of the fence.

The invention has been described as applied for 12 key operations as many keys being depressed as there are holes to be verified, but is equally applicable to a typewriter keyboard in which one key could operate a number of bails in accordance with the combination desired so as to utilize a combinational code of holes for alphabet.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. A machine for verifying a perforated record card comprising, in combination, an escapement mechanism operable when energized to advance the card, a circuit including a switch for controlling the energizing of said escapement mechanism, an elongated member operatively connected at a point between its ends to said switch for positioning the latter, a manually operable key connected to one end of said elongated member, a pin connected to the other end of said elongated member for sensing perforations in said card, and means yieldingly supporting said elongated member and adapted to be moved by said key toward the card, said switch closing when a perforation is sensed by said pin coincident with the operation of said key.

2. A machine for vertifying perforations at a plurality of index positions in different columns of a record card comprising, in combination, an escapement mechanism operable when energized to advance the record card from one column to the next, a circuit including switches corresponding to said index positions for controlling the energizing of said escapement mechanism, said switches connected in series and movable selectively from normally closed positions through open positions to closed positions again, elongated members for said switches, each member connected at a point between its ends to one of said switches, manually operable keys connected to one end of said members, pins connected to the other end of said members for sensing perforations in said card, and means yieldingly supporting said elongated members and adapted to be moved toward said card by any one of said keys on manual operation of the latter, said elongated members operating to move the switches connected thereto to their open positions when the key setting and the card perforations do not correspond.

3. The machine of claim 2 in which said elongated members operate to move the switches connected thereto through their open positions to closed positions again when perforations are sensed by the pins of the members whose keys are operated.

4. The machine of claim 2 in which said supporting means comprises a frame underlying said elongated members, a ball arranged for actuation by said keys, means pivotally connecting said frame to said bail, means guiding said frame for movement in a path substantially normal to said card, and means for yieldingly holding said elongated members in engagement with said frame.

5. A machine for verifying a perforated record card comprising, in combination, an escapement mechanism operating on the energizing and de-energizing thereof for advancing said card, a circuit including a switch for controlling the energizing and deenergizing of said escapement mechanism, means including a manually operable key and a member sensing perforations in said card for positioning said switch, said key and said member operating to move said switch to a closed position when a perforation is sensed coincident with the operation of the key, a holding circuit connected in parallel with said switch and including contacts adapted to be closed on the energizing of said escapement mechanism, and a commutator connected for movement with said switch and operating to control said circuits, said commutator completing the circuit including said switch after the latter is closed and opening said holding circuit after said sensing member has been removed from the perforation.

6. A machine for verifying a perforated record card comprising, in combination, an escapement mechanism operating on the energizing and de-energizing thereof for advancing said card, a circuit including a switch for controlling the energizing and deenergizing of said escapement mechanism, an elongated member operatively connected at a point between its ends to said switch for positioning the latter, a manually operable key connected to one end of said elongated member, a pin connected to the other end of said member for sensing perforations in said card, means yieldingly supporting said elongated member and adapted to be moved by said key toward the card, said switch closing when a perforation is sensed by said pin coincident with the operation of said key, a holding circuit connected in parallel with said switch and including contacts adapted to be closed on the energizing of said escapement mechanism, and a commutator connected for movement with said switch and operating to control said circuits, said commutator completing said circuits on closure of said switch and opening said holding circuit after the switch is moved from its closed position and the pin is removed from the perforation in said card.

7. A machine for verifying perforations at a plurality of index positions in different columns of a card comprising, in combination, an escapement mechanism operating on the energizing and deenergizing thereof for advancing said card, a circuit including switches corresponding to said index positions for controlling the energizing and deenergizing of said escapement mechanism, said switches connected in series and movable selectively from normally closed positions through open positions to closed positions again, means including manually operable keys and members sensing perforations in said card for positioning said switches, said keys and said members operating to move said switches through open positions to closed positions again when perforations are sensed coincident with the operation of said keys, a holding circuit connected in parallel with said switches and including contacts adapted to be closed by said escapement mechanism when energized, and a commutator connected for movement with said switches and operating to complete said circuits on closing said switches and to maintain said holding circuit closed until said switches and members are returned to their normal positions.

8. The machine of claim 7 in which said switches are moved to open positions when the key setting and perforations do not correspond, a release mechanism operable when energized for advancing said card to its last column, means including a relay operating on movement of said switches to open positions for closing contacts in a circuit including said release mechanism, and means for connecting the circuit including said release mechanism to a source of electric energy when any of said switches are opened again by operation of said keys.

9. The machine of claim 7 in which said switches are moved to open positions when the key setting and perforations do not correspond, a release mechanism operable when energized for advancing said card to its last column, means including a relay operating on movement of said switches to open positions for closing contacts in a circuit including said release mechanism, and means including contacts adapted to be opened by said escapement mechanism when energized for deenergizing said relay and effecting an opening of the contacts in the circuit including said release mechanism.

10. A machine for verifying perforations at a plurality of index positions in different columns of a card comprising, in combination, an escapement mechanism operating on the energizing and deenergizing thereof for advancing said card, a circuit including switches corresponding to said index positions for controlling the energizing and deenergizing of said escapement mechanism, said switches connected in series and movable selectively from normally closed positions through open positions to closed positions again, means including manually operable keys and members sensing perforations in said card for positioning said switches, said keys and said members operating to move said switches to open positions when the key setting and perforations do not correspond and operating to move said switches through open positions to closed positions again when perforations are sensed coincident with the operation of said keys, a holding circuit connected in parallel with said switches and including contacts adapted to be closed by said escapement mechanism when energized, a commutator connected for movement with said switches and operating to complete said circuits on closing said switches and to maintain said holding circuit closed until said switches and members are returned to their normal positions, normally closed contacts connected in the circuit with said switches, means including a differential relay adapted to be energized on movement of said switches to open positions for effecting an opening of said normally closed switch, a release mechanism operable when energized for advancing said card to its last column, a circuit including normally open contacts for controlling the energizing of said release mechanism, means including a relay operable when energized for closing said normally open contacts, and a second pair of contacts connected in the circuit with said release mechanism and controlled by said differential relay, said differential relay operating when deenergized to effect an energizing of said last mentioned relay and operating when energized again to close said second pair of contacts.

11. A machine for verifying perforations at a plurality of index positions in different columns of a card comprising, in combination, an escapement mechanism operating on the energizing and deenergizing thereof for advancing said card, a circuit including switches corresponding to said index positions for controlling the energizing and deenergizing of said escapement mechanism, said switches connected in series and movable selectively from normally closed positions through open positions to closed positions again, means including manually operable keys and members sensing perforations in said card for positioning said switches, said keys and said members operating to move said switches to open positions when the key setting and perforations do not correspond and operating to move said switches through open positions to closed positions again when perforations are sensed coincident with the operation of said keys, a holding circuit connected in parallel with said switches and including contacts adapted to be closed by said escapement mechanism when energized, a commutator connected for movement with said switches and operating to complete said circuits on closing said switches and to maintain said holding circuit closed until said switches and members are returned to their normal positions, a release mechanism operable when energized for advancing said card to its last column, a circuit including two pairs of normally open contacts for controlling said release mechanism, and means including a differential relay adapted to be energized on movement of said switches to open positions for controlling said pairs of contacts, said last mentioned means operating on an energizing and deenergizing of said differential relay for closing one of said pairs of contacts and operating when energized again to close the other of said pairs of contacts.

12. The machine of claim 11 including a holding circuit for said differential relay, said holding circuit including a pair of manually controlled contacts and one of said two pairs of contacts adapted to be closed by said differential relay when energized.

13. The machine of claim 11 including a member normally obstructing removal of the card when moved to its last column, and means for removing said obstructing member from the path of said card when the key setting and card perforations in the last column correspond.

14. The machine of claim 11 including a member normally obstructing removal of the card when moved to its last position, a magnet operable when energized to remove said member from the path of said card, a circuit including a pair of normally open contacts connecting said magnet in series with said switches, and means for closing said last mentioned contacts when said card is moved to its last column.

15. The machine of claim 11 in which said differential relay has one winding connected in series with said switches and another winding connected in parallel with said switches, said differential relay operating to close said two pairs of switches when its winding connected in parallel with said switches is energized and its other winding is deenergized.

HAROLD HALL KEEN.

REFERENCES CITED

The following references are of record in the file of this patent:

UNITED STATES PATENTS

| Number | Name | Date |
|---|---|---|
| 1,578,717 | Daubmeyer | Mar. 30, 1926 |
| 2,043,280 | Bryce | June 9, 1936 |